US010287503B2

(12) United States Patent
Montbach et al.

(10) Patent No.: US 10,287,503 B2
(45) Date of Patent: May 14, 2019

(54) ENHANCED BRIGHTNESS EWRITER DEVICE

(71) Applicant: KENT DISPLAYS INCORPORATED, Kent, OH (US)

(72) Inventors: Erica N. Montbach, Kent, OH (US); Asad A. Khan, Kent, OH (US); Mauricio Echeverri, Akron, OH (US); Clinton I. Braganza, Kent, OH (US)

(73) Assignee: Kent Displays Inc., Kent, OH (US)

( * ) Notice: Subject to any disclaimer, the term of this patent is extended or adjusted under 35 U.S.C. 154(b) by 166 days.

(21) Appl. No.: 15/160,767

(22) Filed: May 20, 2016

(65) Prior Publication Data

US 2016/0342023 A1 Nov. 24, 2016

Related U.S. Application Data

(60) Provisional application No. 62/164,890, filed on May 21, 2015.

(51) Int. Cl.
*C09K 19/02* (2006.01)
*C09K 19/54* (2006.01)
(Continued)

(52) U.S. Cl.
CPC ............ *C09K 19/544* (2013.01); *C09K 19/02* (2013.01); *G02F 1/1334* (2013.01); *G02F 1/13718* (2013.01)

(58) Field of Classification Search
CPC .. G02F 1/1335; G02F 1/13357; G02F 1/1334; G02F 1/13718; C09K 19/544; C09K 19/02
(Continued)

(56) References Cited

U.S. PATENT DOCUMENTS 5,493,430 A 2/1996 Lu et al.
6,104,448 A 8/2000 Doane et al.
(Continued)

OTHER PUBLICATIONS

International Search Report and Written Opinion dated Aug. 8, 2016 for PCT/US2016/033570.
(Continued)

*Primary Examiner* — Charles S Chang
(74) *Attorney, Agent, or Firm* — Abel Schillinger, LLP

(57) ABSTRACT

An enhanced brightness cholesteric liquid crystal eWriter device for writing and drawing includes substrates and electrically conductive layers disposed on the substrates. There is a gap, d, between the electrically conductive layers. Polymer dispersed cholesteric liquid crystal material is disposed in the gap. The polymer dispersed cholesteric liquid crystal material exhibits a written reflectance, R, which occurs in response to pressure applied to one of the substrates that changes reflectance of the cholesteric liquid crystal material. The device follows the relationship Rd1<Rd2 and d1>d2, where Rd2 is a written reflectance of an eWriter device of gap d2 and Rd1 is written reflectance of another eWriter device of gap d1. Further, a cholesteric liquid crystal eWriter device includes a layer of cholesteric liquid crystal material in a cell gap, d, wherein d<3 μm. Also included is an enhanced brightness eWriter with other features and a method of constructing an enhanced brightness, cholesteric liquid crystal eWriter.

21 Claims, 4 Drawing Sheets

Figure 1:
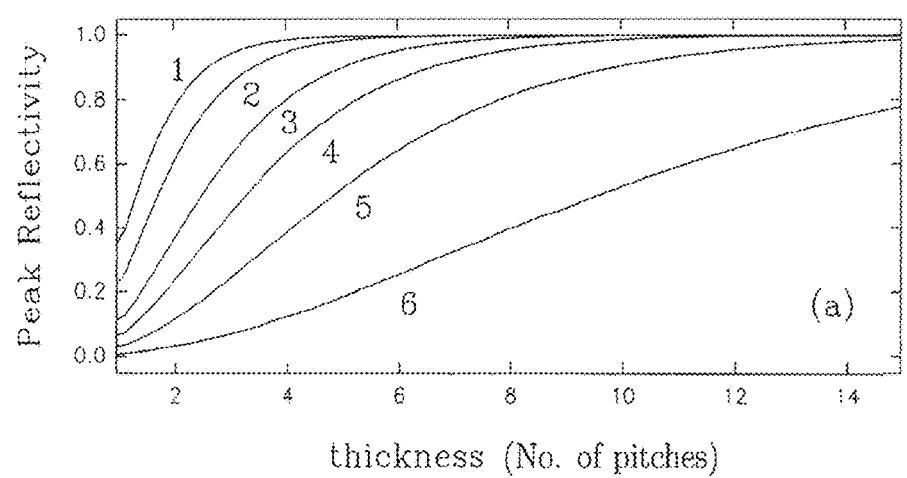

(51) Int. Cl.
*G02F 1/1334* (2006.01)
*G02F 1/137* (2006.01)

(58) Field of Classification Search
USPC .......................................................... 349/88
See application file for complete search history.

(56) References Cited

U.S. PATENT DOCUMENTS

| | | | |
|---|---|---|---|
| 7,351,506 | B2 | 4/2008 | Schneider et al. |
| 8,139,039 | B2 | 3/2012 | Schneider et al. |
| 8,228,301 | B2 | 7/2012 | Schneider |
| 9,116,379 | B2 | 8/2015 | Braganza et al. |
| 2003/0043317 | A1* | 3/2003 | Cirkel ................. G02F 1/13306 349/84 |
| 2008/0309598 | A1 | 12/2008 | William et al. |
| 2009/0009710 | A1* | 1/2009 | Nirmal ................ G02F 1/13718 349/176 |
| 2009/0096942 | A1 | 4/2009 | Schneider et al. |
| 2010/0165260 | A1* | 7/2010 | Hiji ....................... G02F 1/1334 349/89 |
| 2010/0265214 | A1 | 10/2010 | Green et al. |
| 2012/0099030 | A1 | 4/2012 | Pishnyak |
| 2013/0314622 | A1* | 11/2013 | Braganza ............ G02F 1/13718 349/12 |
| 2015/0054775 | A1 | 2/2015 | Montbach et al. |

OTHER PUBLICATIONS

P. S. Drzaic; Liquid Crystal Dispersions, (World Scientific: Singapore, 1995).

W. D. St. John, et al., "Bragg reflection from cholesteric liquid crystals", The American Physical Society, p. 1191-1198. 1995.

F. Bruyneel, et al. "Method for measuring the cell gap in liquid-crystal displays", Opt. Eng. 40(2), p. 259-267, Feb. 1, 2001.

Schnieder, et al. "UV Cured Flexible Cholesteric Liquid Crystal Displays" Apr. 2008. 11 pgs.

U.S. Appl. No. 13/621,367, filed Sep. 17, 2016 Inventors: Hunter Morris, et al.

* cited by examiner

ENHANCED BRIGHTNESS EWRITER DEVICE

CROSS-REFERENCE TO RELATED APPLICATION(S)

This application claims priority under 35 U.S.C. § 119(e) to U.S. Patent Application No. 62/164,890 entitled "ENHANCED BRIGHTNESS EWRITER DEVICE" by Inventors Erica N. Montbach et al., filed May 21, 2015, which is assigned to the current assignee hereof and incorporated herein by reference in its entirety.

BACKGROUND OF THE DISCLOSURE

This disclosure relates generally to a cholesteric eWriter, for example, utilizing a pressure sensitive writing tablet as referred to in the prior art. In general, Bistable Liquid Crystal Displays, and in particular, Cholesteric Liquid Crystal Displays (ChLCDs), (also called chiral nematic liquid crystals) have proven to have great potential to create low cost pressure sensitive eWriters that are efficient power consumers and that can be utilized in a number of unique devices.

Recently, the BOOGIE BOARD® pressure sensitive cholesteric liquid crystal eWriter of Kent Displays Inc. has appeared on the market in which a pointed stylus or the finger can be used to write or trace an image on the surface of the tablet as described in U.S. Pat. No. 6,104,448, which is incorporated herein by reference in its entirety. As used in this disclosure, the term eWriter includes any device including substrates and an electrooptical material disposed between the substrates which exhibits a change in reflectance as a result of writing pressure applied to one of the substrates, the device being able to be erased upon application of a voltage. This definition of an eWriter excludes devices that are only able to be written on by digitally electrically addressing the liquid crystal as in the case of a laptop that employs a display actively driven with a TFT array. The cholesteric liquid crystal eWriter offers a considerable improvement over previous technologies in that the image can be simply and instantly erased with the push of a button that applies a voltage pulse to electrically conductive electrodes in the eWriter. In a cholesteric liquid crystal eWriter, the liquid crystal, dispersed in a polymer network, is sandwiched between two substrates that are spaced to a particular gap. Cell gap is used interchangeably with gap in this disclosure and is the distance between electrodes. The cholesteric liquid crystal eWriter polymer network can be created by several polymer dispersed liquid crystal types; including Polymerization Induced Phase Separation (PIPS), Thermally Induced Phase Separation (TIPS), or Solvent Induced Phase Separation (SIPS), as referred to in Drzaic, P. S. (1995) Liquid Crystal Dispersions. Singapore; World Scientific, which is incorporated herein by reference, and are well known to one skilled in the art of eWriters. PIPS is the use of light to initiate polymerization and ultimately cause the liquid crystal molecules and polymer structure to phase separate. TIPS is the use of temperature to initiate the chemical reaction thus resulting in the liquid crystal phase separating from the polymer structure. SIPS is the use of solvent evaporation to cause the liquid crystal to phase separate from the polymer structure.

Both substrates of the cholesteric liquid crystal eWriter are flexible and the bottom substrate is painted with an opaque light absorbing dark background. The upper substrate and upper electrode are optically clear. Within the gap is a bistable cholesteric liquid crystal which can exhibit two textures, a substantially transparent (focal conic) texture and a color reflective (planar) texture. The spacing of the cell gap is usually set by plastic or glass spacers that are either cylindrical or spherical in shape. The cholesteric liquid crystal eWriter is initialized by applying voltage pulses to the electrodes to electrically drive the cholesteric material to the substantially transparent texture. When one presses on the top substrate with a pointed stylus or finger, the liquid crystal is locally displaced. Flow induced in the liquid crystal changes its optical texture from substantially transparent to a reflective color at the location of the stylus. The reflective color contrasts well with the dark background of the lower substrate. An image traced by the stylus or finger nail will remain on the tablet indefinitely without application of a voltage until erased. Erasure is accomplished by applying a voltage pulse to transparent conducting electrodes on the inner surface of the two substrates that drive the cholesteric liquid crystal from its color reflective state back to its substantially transparent state.

The above described principle is disclosed in more detail in U.S. Pat. No. 6,104,448. Dispersions of liquid crystal in a polymer matrix can be used to control the pressure sensitivity and resolution of the image as described in U.S. Pat. No. 8,228,301, which are suitable for use in the cholesteric enhanced brightness eWriter of this disclosure, this patent being incorporated herein by reference in its entirety. Other modes of operation and a cholesteric liquid crystal eWriter that can produce multiple color images are described in this U.S. Pat. No. 8,228,301 patent, and a means for select erase is disclosed in U.S. Pat. No. 8,139,039, incorporated herein by reference in its entirety, all of which are suitable for use in the cholesteric eWriters of this disclosure. One mode of operation, known as Mode A, provides a negative image from that described above. In that mode the tablet is initialized by electrically driving the tablet display to the color reflective planar texture with a voltage pulse or pulses. Then one can write images by driving the cholesteric material to the substantially transparent texture with the pressure of a pointed stylus and simultaneous application of a voltage to the electrodes sandwiching the cholesteric liquid crystal. This mode of operation with a color reflective background is termed Mode A whereas the other mode with a transparent background is termed Mode B.

The commercial BOOGIE BOARD® cholesteric liquid crystal eWriter, operated in Mode B, has the color black for the fixed opaque light absorbing background. The dark black background offers high contrast for the color reflective image written on the tablet. As disclosed in U.S. Pat. No. 5,493,430, incorporated herein by reference in its entirety, other opaque colors may also be used for the fixed background of a cholesteric liquid crystal display. The color of the background additively mixes with the reflective color to present a different color than that of the cholesteric liquid crystal. There may be multiple colors on the background and those colors may be patterned. As an example, the pattern could be lines offering a lined tablet for convenience in writing text similar to a ruled paper tablet.

A problem with the prior art is that the reflectivity is low for a written texture and needs to be improved. There is always a desire for higher brightness devices to write and draw on. The prior art discloses cholesteric liquid crystal eWriters with written reflectivity and contrast ratio that is sufficient for seeing the handwritten work, but for a more desirable writing experience improvement is needed. An understanding of the prior art is that to increase reflectivity from a typical cholesteric display that is electrically driven to the planar texture, then the cell gap of the display must be increased [W. D. St. John et. al, "Bragg reflection from cholesteric liquid crystals," The American Physical Society, 1191-1198 (1995)].

SUMMARY

Disclosed is an enhanced brightness, cholesteric liquid crystal eWriter device with a written reflectivity that increases with decreasing cell gap. This increase in written reflectance may occur below a reference cell gap and typically occurs at a cell gap in the range between 1 and 5 µm. When the cell gap is above the reference cell gap value, an eWriter display shows a relatively flat or even a conventionally expected increasing written reflectivity with increasing cell gap. However the inventors have found that once below the reference cell gap value, an eWriter made with the same materials will unexpectedly show an increase in written reflectivity as the cell gap is decreasing. This is a non-obvious solution as prior art literature teaches against this type of trend.

As discussed, a problem in the prior art is that the reflectivity is low for a written texture of cholesteric liquid crystal eWriters and needs to be improved. Reference to a "written texture" or "written reflectivity" in this disclosure means the texture comprising writing or drawing on the eWriter, which occurs upon application of pressure to the outer writing surface of the eWriter, such as with a stylus or fingernail, that changes reflectance of the cholesteric liquid crystal material in contrast with a background of the eWriter. In forming the written texture a voltage may be applied or not. In one aspect of the disclosure in what is known as Mode B, the application of pressure causes flow of the liquid crystal that changes reflectance from the focal conic texture to the reflective planar texture without voltage being applied to the electrodes sandwiching the liquid crystal. This is in contrast to prior art cholesteric liquid crystal displays that are only electrically addressed to produce an image.

A first aspect of the disclosure features an enhanced brightness, cholesteric liquid crystal eWriter device for writing and drawing. The eWriter includes the following features. Substrates are part of the eWriter. Electrically conductive layers are disposed on the substrates, wherein there is a gap, d, between the electrically conductive layers. Polymer dispersed, cholesteric liquid crystal material is disposed in the gap. The polymer dispersed, cholesteric liquid crystal material exhibits a written reflectance, R, which occurs in response to pressure applied to one of the substrates that changes reflectance of the cholesteric liquid crystal material. The device follows the relationship $Rd1<Rd2$ and $d1>d2$, where $Rd2$ is a written reflectance of an eWriter device of gap $d2$ and $Rd1$ is written reflectance of another eWriter device of gap $d1$.

Referring now to specific features that may be included in the first aspect of the disclosure, the written reflectance, R, is at least 12% and thickness of the gap, d, is 0.5 µm≤d≤5 µm. Another feature is that the written reflectance R is greater than or equal to 12% and thickness of the gap, d, is 1 µm≤d≤3 µm. Another feature is that an erasing device applies voltage pulses to the electrically conductive layers. Still further, a first of the substrates is formed of a clear flexible polymer material and a writing surface is formed by the first substrate or by an outer clear flexible, polymer layer adjacent to the first substrate; the pressure is applied to the writing surface to form the written reflectance R that is viewed from the writing surface.

Yet another specific feature that may be included in the first aspect of the disclosure, is that the conductive layers include a continuous, unpatterned portion. Another feature is that the continuous, unpatterned portion of the electrically conductive layers extends for at least a majority of a surface area of the writing surface.

A second aspect of the disclosure features a cholesteric liquid crystal eWriter device that includes a layer of cholesteric liquid crystal material disposed in a cell gap, d, wherein d<3.0 µm.

Referring now to specific features that may be included in the second aspect of the disclosure, d≥0.5 µm. Another feature is that d≤2.5 µm, and in particular, d≤2.0 µm. Another feature is that the eWriter has a written reflectivity, R, where R≥15%. Still further, the eWriter includes bistable cholesteric liquid crystal material.

Yet other specific features that may be included in the second aspect of the disclosure, are that the eWriter device includes:

a. flexible polymeric substrates;

b. electrically conductive layers disposed on the substrates, wherein the gap, d, is located between the electrically conductive layers;

c. a dispersion of the cholesteric liquid crystal material in polymer, which is disposed in the gap, wherein the cholesteric liquid crystal material exhibits a written reflectance, R, which occurs when pressure applied to one of the substrates causes flow of the cholesteric liquid crystal material that changes a reflectance thereof.

Yet other specific feature that may be included in the second aspect of the disclosure, is that the electrically conductive layers include a continuous, unpatterned portion. Another feature is that the continuous, unpatterned portion of the electrically conductive layers extends for at least a majority of a surface area of the writing surface.

A third aspect of the disclosure features an enhanced brightness, cholesteric liquid crystal eWriter device comprising polymer dispersed cholesteric liquid crystal material disposed between polymer substrates, including written reflectivity, R, where R≥15%.

A fourth aspect of the disclosure features an enhanced brightness, cholesteric liquid crystal eWriter device that includes the following features:

a. first and second substrates, the first substrate comprising a flexible, clear material;

b. a first clear, electrically conductive layer disposed on the first substrate and a second electrically conductive layer disposed on the second substrate, wherein there is a gap, d, between the first electrically conductive layer and the second electrically conductive layer;

c. polymer dispersed, bistable cholesteric liquid crystal material disposed in the gap, wherein the polymer dispersed, bistable cholesteric liquid crystal material exhibits a written reflectance, R, which occurs in response to pressure applied to the first substrate that changes reflectance of the liquid crystal material, wherein R≥15% and thickness of the gap, d, is 0.5 µm≤d≤5 µm.

Yet other specific features that may be included in the fourth aspect of the disclosure, are that the thickness of the gap, d, is <3 µm. Another feature is that d≤2.5 µm, and in particular, d≤2.0 µm.

A fifth aspect of the disclosure features a series of enhanced brightness cholesteric liquid crystal eWriter devices for writing and drawing satisfying a regime that follows a negative slope of written reflectance as a function of cell gap.

A sixth aspect of the disclosure features a method of constructing an enhanced brightness cholesteric liquid crystal eWriter device for writing and drawing, including the following steps:

a. evaluating polymer dispersed cholesteric liquid crystal material to identify a regime where there is a negative slope of written reflectance as a function of cell gap;

b. selecting a cell gap that satisfies the regime; and c. designing the eWriter to include the polymer dispersed bistable cholesteric liquid crystal material and the gap that satisfies the regime.

With regard to the understanding of the prior art that to increase reflectivity from a typical cholesteric display, the cell gap of the display must be increased [W. D. St. John et. al, "Bragg reflection from cholesteric liquid crystals," The American Physical Society, 1191-1198 (1995)], the inventors of this disclosure have unexpectedly found the opposite behavior exists for some cholesteric liquid crystal eWriters: the written reflectivity increases as the cell gap is decreased. So, by decreasing the cholesteric liquid crystal display's cell gap to very small thicknesses, the inventors are able to achieve greatly improved brilliant written reflectivities with a lustrous, eye catching effect where spectacular brilliant colored written lines are on a dark background.

Many additional features, advantages and a fuller understanding of the embodiments of the disclosure will be had from the accompanying drawings and the detailed description that follows. It should be understood that the above Summary describes embodiments of the disclosure in broad terms while the following Detailed Description describes embodiments of the disclosure more narrowly and presents specific embodiments that should not be construed as necessary limitations of the invention as broadly defined in the claims.

BRIEF DESCRIPTIONS OF DRAWINGS

FIG. 1: Prior art graph (W. D. St. John, et. al) showing Peak reflectivity at FWHM (bottom) versus the cell gap thickness. The peak reflectivity is parameterized by the birefringence with (1) $\Delta n=0.35$, (2) $\Delta n=0.3$, (3) $\Delta n=0.25$, (4) $\Delta n=0.20$, (5) $\Delta n=0.15$, (6) $\Delta n=0.10$. The reflectivity clearly decreases as the cell gap decreases for all values of liquid crystal birefringence presented.

Figure 2:
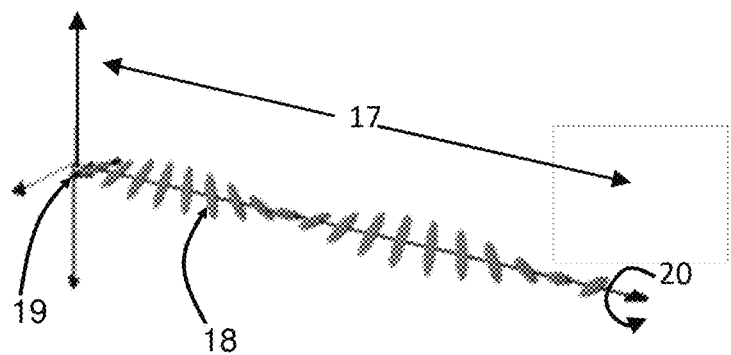

FIG. 2: Illustration showing the pitch length with respect to the cholesteric liquid crystal molecule's director rotation.

Figure 3:
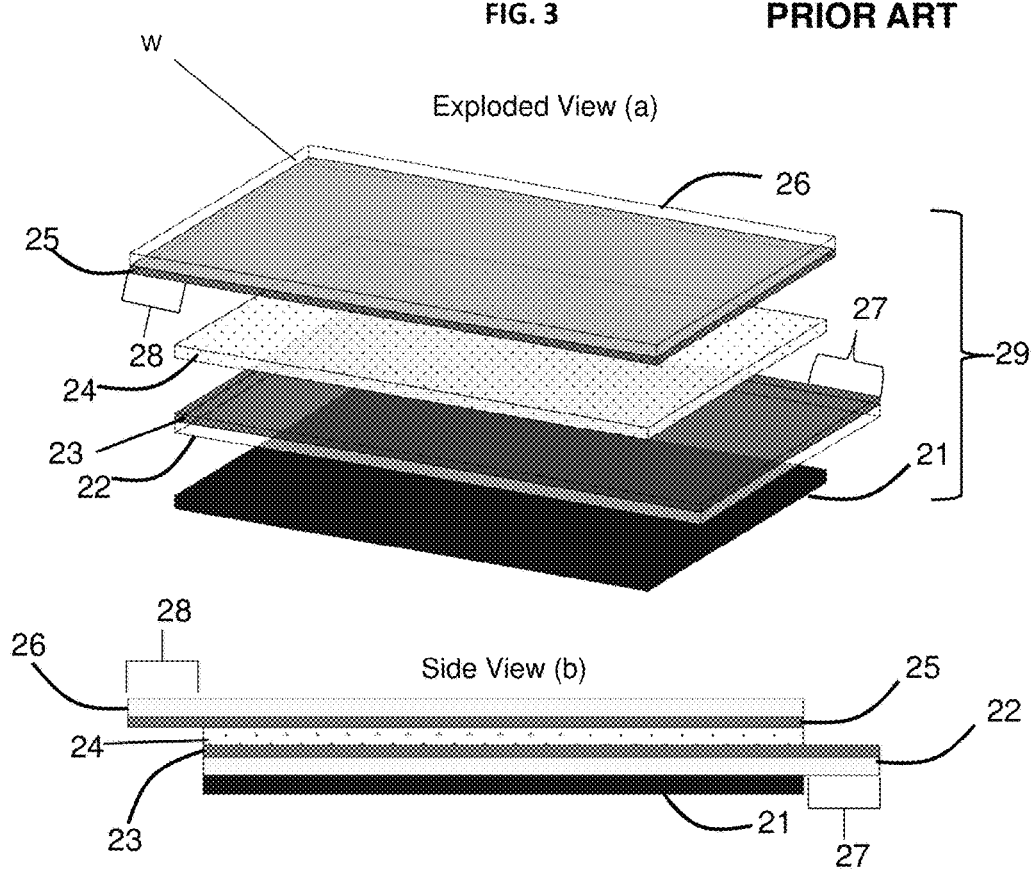

FIG. 3: Illustration showing the components of a commercially available Boogie Board® flexible cholesteric liquid crystal eWriter of the prior art, the components of which can be used in the present disclosure.

Figure 4:
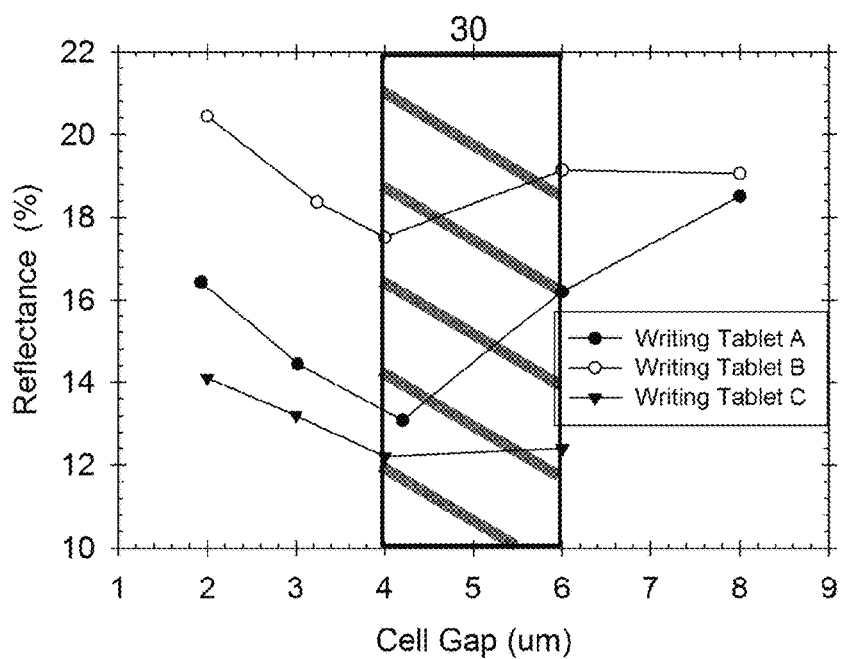

FIG. 4: Reflectance versus cell gap for three different cholesteric liquid crystal eWriters. eWriter C shows a somewhat lower reflectance than the other two eWriters (all eWriters A, B, and C meet the aspects of the enhanced brightness cholesteric liquid crystal eWriters of the present disclosure but include different cholesteric liquid crystal materials); however, eWriter C also shows considerably more spectacular brilliant colored written lines once built with thinner cell gaps.

DETAILED DESCRIPTION

In a cholesteric liquid crystal display of the prior art such as a display described in St. John et. al there is a relationship that the reflectivity of the display increases as the cell gap increases as shown in FIG. 1. Due to the chiral and periodic structure of cholesteric liquid crystals they Bragg reflect light that is peaked at a wavelength given by the Bragg formula $\lambda = \langle n \rangle P$, where $\langle n \rangle$ is the average index of refraction and P is the pitch. The peak reflectivity is measured at the wavelength that meets the Bragg condition. The peak reflectivity versus cell thickness (by way of the number of cholesteric liquid crystal pitches) is shown for various birefringence cholesteric liquid crystals with 1 $\Delta n=0.35$, 2 $\Delta n=0.3$, 3 $\Delta n=0.25$, 4 $\Delta n=0.20$, 5 $\Delta n=0.15$, 6 $\Delta n=0.10$, where the birefringence is the difference between the index of refraction of the ordinary and extraordinary components of the liquid crystal. The reflectivity increases as the cell gap (or thickness) increases until a certain number of pitch lengths is met for the cholesteric liquid crystal. The reflectivity plateaus at a maximum reflectivity once the certain number of pitch lengths of the cholesteric layer is met. A significant parameter for cholesteric liquid crystals is the pitch length, as illustrated in FIG. 2. The pitch, 17, is defined as the distance it takes for the rod-like cholesteric liquid crystal molecule's, 18, director to rotate, 19, one full turn in the helix, where the director is the orientation that liquid crystal molecules tend to point with some direction associated. The rotation of the cholesteric liquid crystal molecules in the helix is shown by 20.

In a cholesteric liquid crystal eWriter of the prior art such as the Boogie Board® eWriter, which may be used in this disclosure (FIG. 3), typical drive electronics are used to erase the written image to the initial focal conic texture. Referring to FIG. 3, an opaque coating 21 is placed on the bottom transparent plastic substrate 22 that is coated on its other surface with a transparent electrically conductive layer 23. The remainder of the display includes a layer 24 of a cured dispersion of liquid crystal, polymer (such as described in U.S. Pat. Nos. 6,104,448 and 8,228,301) and spacers, and an optically clear, flexible top polymeric substrate 26 coated with a transparent electrical conductor 25. In this example, an outer surface of the top substrate 26 forms a writing surface W upon which pressure of a stylus or fingernail is applied to form the writing/drawing on the eWriter. However, other optically clear, flexible polymer layer(s) (e.g., an outermost polymeric protective layer) can be formed adjacent the top substrate so as to form the writing surface W. The electrically conductive layers 23, 25 are typically continuous and unpatterned. However, the cholesteric liquid crystal eWriter of the disclosure may also include a portion of the writing surface with patterned electrodes and/or an actively driven portion (e.g., including a TFT array). In this example embodiment, the bottom and top substrates are extended to create the bottom ledge 27 and top ledge 28. The transparent conductive layers 23 and 25 are exposed on the ledges 27 and 28, respectively, for connecting to drive electronics so that a voltage or voltage pulses may be applied across electrically conductive layers 23 and 25 as is sufficient to initialize or erase an image or operate the display in Mode A, Mode B, multimode or select erase as described in U.S. Pat. Nos. 8,228,301 and 8,139,039, which are incorporated herein by reference in their entireties. The entire cholesteric liquid crystal eWriter 29 incorporates all the layers shown so far. A drawback of prior art cholesteric liquid crystal eWriters has been that the brightness could be improved. It would be desirable to have an enhanced brightness eWriter to allow for improved visibility of written and drawn images in varying lighting conditions. The enhanced brightness eWriter of the present disclosure could be used in any application where existing eWriters are used. This will provide a more pleasing writing experience particularly in lighting conditions that are not optimal.

The cholesteric liquid crystal enhanced brightness eWriter devices of this disclosure can be designed as stand alone devices or they can be integrated into other devices, for example, into electronic blackboards or whiteboards.

The cholesteric liquid crystal enhanced brightness eWriter device of this disclosure can be designed with data capture functionality including: a power supply for powering the device; a memory storage device; a pressure sensitive drawing surface integrated in the tablet device and adapted to display back to the user a result of an image drawn and written upon the drawing surface by application of pressure by the user, the display back to the user provided without the pressure sensitive drawing surface consuming electrical energy; a data capture device for electronically capturing the image drawn and written upon the drawing surface into data for storing in the memory storage device; and a data interface adapted to connect the tablet device to an external device (e.g., a laptop, PC or cell phone) and also adapted to transmit the data stored in the memory storage device to the external device for reproducing on the external device the image drawn and written upon the drawing surface, as disclosed in the U.S. patent application Ser. No. 12/787,843, which is incorporated herein by reference.

The cholesteric liquid crystal, enhanced brightness eWriter device may include a rigid or flexible protective casing. The entire cholesteric liquid crystal, enhanced brightness eWriter device may be flexible so as to form liquid crystal paper. A stylus may be included with the eWriter.

As disclosed in U.S. Pat. No. 9,116,379, which is incorporated herein by reference in its entirety, rather than employing an opaque light absorbing layer 21 (FIG. 3), the cholesteric liquid crystal, enhanced brightness eWriter device of this disclosure can make use of semitransparent inks or color filters for the background of the device. For the purposes of this disclosure, the term semitransparent means: transparent to selected wavelengths of visible light with remaining wavelengths fully or partially absorbed. In this case, the semitransparent ink or color filter is used as a semitransparent light absorbing layer. The small absorption enhances the contrast of the cholesteric reflection when the image is written. Also, choosing certain color combinations of semitransparent ink and the peak of the cholesteric reflection can yield a new color not only for the written image, but also the background. The semitransparency of the eWriter device of this disclosure enables the use of a back pattern (e.g., templates or patterns) to be placed behind the semitransparent light absorbing layer for writing, drawing, tracing or coloring in on the liquid crystal of the device. For example, coloring on the liquid crystal of the dispersion layer over the pattern will appear as if one colored in the pattern using a colored marker in contact with the pattern. Except that the color reflected by the liquid crystal, the colors reflected, absorbed and transmitted through the semitransparent back layer and the color of the pattern, will influence the colors seen by the viewer of the display. The ink coating or filter can also be used to reduce unwanted reflections between the back substrates and template. Colored templates can be used to change the background pattern, the color of the display and the color of the written image. The back pattern can be removable and selected from the group consisting of a template of a sports field, court or arena, a pattern for a children's game, an image for children to color, notepad lines, graph paper lines, or a menu of items that one can choose from. In another embodiment the back pattern seen as the background of the tablet can be formed by an electronic skin; waveguide; emissive, backlit or reflective display, or other device capable of exposing or hiding a pattern. The eWriter device of this disclosure can include structure enabling a back pattern template of polymer, paper or the like to be fastened to the eWriter device. The eWriter device of this disclosure can even be a standalone device having the semitransparent back layer forming a back surface of the device or covered by a protective layer as the back surface of the device, without an associated back pattern.

In the prior art Boogie Board® eWriters and in the inventive enhanced brightness eWriters there are multiple components in the mixture, including: crosslinkers that have multiple polymerizable sites on each molecule and monomers that have one polymerizable site on each molecule. Polymerization can be categorized by identifying the fraction of crosslinkers and monomers in the polymer/LC dispersion by calculating the functionality (F), using the number of polymerizable groups on each component. The functionality (F) is obtained according to the following equation:

$$F = \sum_{x=1}^{n} f_x * M_x / \sum_{x=1}^{n} M_x$$

and approximates the rate of polymerization by calculating the average number of polymerizable groups per molecule, where, fx is the number of polymerizable groups, Mx is a mass fraction of the dispersion material, and n is the number of polymerizable monomers in the dispersion. This equation and examples of how it was used are described in U.S. Pat. No. 7,351,506, which is incorporated herein by reference in its entirety.

In the inventive enhanced brightness cholesteric liquid crystal eWriter, drive electronics are used that are similar to that of the prior Boogie Board® eWriter devices, for example, as described in the U.S. Pat. No. 8,228,301 patent. In addition, the enhanced brightness, cholesteric liquid crystal eWriter of this disclosure has the same or similar components as the prior art Boogie Board® eWriter devices or Boogie Board® Sync™ eWriter devices (FIG. 3); however, there are smaller cell gaps to take advantage of the aspects of the present disclosure, where reflectivity increases as cell gap decreases. This can be facilitated, for example, using smaller spacers. In addition, the surfaces of the substrates of the eWriters of this disclosure are not treated chemically and not rubbed in any way; however, both the planar and focal conic states are stable. In the prior Boogie Board® eWriters and in the enhanced brightness eWriter of this disclosure, the morphology of the dispersion of cholesteric liquid crystal in polymer (e.g., PIPS structure) is open celled such that there are polymer pillars and domains of cholesteric liquid crystal between the polymer pillars that can flow from one domain to the next. This flow allows one to apply pressure to the display resulting in the cholesteric liquid crystal flowing to a bright line, for example, without damaging the open celled polymer structure. In addition, this open celled structure allows for crisp line acuity of the written lines, unlike a display made of only cholesteric liquid crystal and no polymer where pressure can be applied to see a bright blob that has the written area grow far beyond the diameter of the stylus tip.

In an enhanced brightness cholesteric eWriter, there is a relationship that as the cell gap decreases the reflectivity increases, as shown in FIG. 4. Several different cholesteric liquid crystal eWriter devices were built and measured to create FIG. 4. For the eWriter A series, 5 different devices were made where everything about the devices in the eWriter A series was the same except for the cell gap. The eWriter A series has a functionality of 1.222. For the eWriter B series, 5 different devices were made where everything about the devices in the eWriter B series was the same except for the cell gap. The eWriter B series has a functionality of 1.374. For the eWriter C series, 4 different devices were made where everything about the devices in the eWriter C series was the same except for the cell gap. The eWriter C series has a functionality of 1.3. The devices in all the eWriter A, eWriter B, and eWriter C series follow the relationship of higher brightness with decreasing cell gap. For example, this relationship may occur below a reference cell gap shown as a reference cell gap range 30, in FIG. 4. The 1 µm increments measured in FIG. 4 are too large of increments to identify the reference cell gap more precisely than a range; however, the reference cell gap is known to exist in reference cell gap range 30. The reference cell gap is defined in this disclosure as being where the slope goes from a negative slope to a positive slope, for written reflectance as a function of cell gap, with increasing cell gap. Reference in this disclosure to a "reference" cell gap is not meant to limit the invention as defined by the present claims to one particular cell gap. Rather, the term reference cell gap is meant to describe an inflection indicating to one skilled in the art reading this disclosure, where the regime of unexpectedly high written reflectance at decreasing cell gap occurs. Reference cell gap is not always required to understand the aspects of the present disclosure and is not always required as a feature in the presently claimed subject matter. In this regard, in FIG. 4, the eWriter devices that fall within the portion of the curve that has a negative slope, for reflectance as a function of cell gap, include the aspects of the enhanced brightness cholesteric liquid crystal eWriters of the present disclosure.

When looking at the prior art, FIG. 1, the slope for reflectance as a function of cell gap is always either positive or zero. It can be seen that the relationship of negative slope of written reflectance at small cell gaps in FIG. 4 is not predicted from the prior art FIG. 1. In FIG. 4 the highest written reflectivity is at 2 µm or less, however, it is understood by the inventors that the written reflectivity will decrease at some point between 0 and 2 µm, since it is known that a 0 µm cell will have no reflectivity. It should be understood that for some cholesteric liquid crystal materials the regime of unexpectedly high written reflectance at decreasing cell gap (i.e. within the portion of the curve that has a negative slope, for reflectance as a function of cell gap) may occur at higher cell gaps than shown in FIG. 4.

The increase in written reflectance of the eWriter of this disclosure, is seen below the reference cell gap 30 (and typically occurs between 1 and 5 µm). Therefore, when the cell gap is above the reference cell gap 30, a cholesteric liquid crystal eWriter device series could show relatively flat or even increasing reflectivity with increasing cell gap; however, once below the reference cell gap range 30, a cholesteric liquid crystal eWriter device series of this disclosure made the same way but with the only change being a thinner cell gap, will show an increase in reflectivity as the cell gap is decreasing. As discussed above, different polymer dispersed cholesteric liquid crystal material may have a reference gap above what is shown in FIG. 4 (i.e., negative slope regions as described above which extend to larger cell gaps).

It is well known in the liquid crystal industry that going to thinner cell gaps is undesirable in that it is expected to result in lower yield due to particles that are larger than the cell gap. The inventors have surprisingly found that the yield is not affected by the thin cell gaps identified here for the inventive enhanced brightness, cholesteric liquid crystal eWriter. It is not well understood why particles are not an issue for such small cell gaps; however, this is a different set of materials, including optically clear, flexible polymer substrates and a dispersion of liquid crystal in polymer (e.g., formed by PIPS) than the glass substrates and pure liquid crystal typically used in the electrically addressable liquid crystal display industry.

Example 1

Enhanced brightness eWriters were built using typical eWriter cholesteric liquid crystal dispersion materials and other device components as demonstrated in prior art U.S. Pat. Nos. 8,228,301 and 8,139,039. The cholesteric liquid crystal eWriters were constructed from two optically clear, flexible polymer substrates and an active layer. The top and bottom substrates were made from 5 mil Polyethylene Terephthalate (PET) that was flood coated with a PEDOT based conducting polymer (CP). The bottom substrate was coated with a black absorber on the side without CP. The active layer includes a dispersion of green (550 nm) cholesteric liquid crystal in a polymer matrix. The active layer of the eWriter is made from a blend of polymerizable monomer, crosslinker, photointiator, nonpolymerizable cholesteric liquid crystal and spacers. The dispersion is phase separated into an open celled cholesteric liquid crystal polymer structure in which the liquid crystal can flow when pressure is applied without damaging the polymer structure. The chemistry used is similar to that in U.S. Pat. No. 8,228,301. The eWriter A series has a functionality of 1.222. The eWriter B series has a functionality of 1.374. Several different spacer configurations were investigated; including 2, 3, 4, 6, and 8 µm as shown in FIG. 4. The cell gap is measured using the peaks from the interference spectrum of white light reflected from the display. The interference peaks are created from an index mismatch between the ChLC/polymer of the PIPS structure and the CP layer. The reflection from each side of the ChLC/PIPS structure constructively interferes with one another to create a period reflectance spectrum. The wavelengths of the peaks in the interference pattern are used to calculate cell gap as shown in reference, Filip Bruyneel; Herbert De Smet; Jan Vanfleteren and Andre' Van Calster "Method for measuring the cell gap in liquid-crystal displays", Opt. Eng. 40(2), 259-267 (Feb. 1, 2001).

The cholesteric liquid crystal eWriter is written on to color in a square large enough for the spectrometer to measure written reflectivity of the planar texture. A d/8° Minolta Spectrophotometer with the specular reflection component included (SCI) was used to determine the written spectra of a portion of the display that was colored in with a stylus creating a 3×3 cm2 reflective square. All measurements were obtained using 10° observer.

Example 2

Several bistable cholesteric eWriters were fabricated to demonstrate the inventive effect of increasing eWriter brightness by decreasing cell gap. For eWriter C series several different spacer configurations were investigated: including 2, 3, 4, and 6 um as shown in FIG. 4. The top and bottom substrates were made from 5 mil Polyethylene Terephthalate (PET) that was flood coated with a PEDOT based conducting polymer (CP). The bottom substrate was coated with a black absorber on the side without CP. The active layer of the writing tablet is made from a blend of polymerizable monomer (prepolymer) and cholesteric liquid crystal. The dispersion is phase separated into an open celled cholesteric liquid crystal polymer structure in which the liquid crystal can flow when pressure is applied without damaging the polymer structure. The chemistry used is similar to that in U.S. Pat. No. 8,139,039. The eWriter C series mixture has a functionality of 1.3.

The cell gap is measured using the peaks from the interference spectrum of white light reflected from the display. The interference peaks are created from an index mismatch between the ChLC/polymer of the PIPS structure and the CP layer. The reflection from each side of the ChLC/PIPS structure constructively interferes with one another to create a period reflectance spectrum. The wavelengths of the peaks in the interference pattern are used to calculate cell gap as shown in reference, Filip Bruyneel; Herbert De Smet; Jan Vanfleteren and Andre' Van Calster "Method for measuring the cell gap in liquid-crystal displays", Opt. Eng. 40(2), 259-267 (Feb. 1, 2001).

The cholesteric liquid crystal eWriter was written on to color in a square large enough for the spectrometer to measure written reflectivity of the planar texture. A d/8° Minolta Spectrophotometer with the specular reflection component included (SCI) was used to determine the written spectra of a portion of the display that was colored in with a stylus creating a 3×3 cm2 reflective square. All measurements were obtained using 10° observer.

Many modifications and variations of the disclosed embodiments will be apparent to those of ordinary skill in the art in light of the foregoing disclosure. Therefore, it is to be understood that, within the scope of the appended claims, the invention can be practiced otherwise than has been specifically shown and described.

What is claimed is:

1. An enhanced brightness, cholesteric liquid crystal device for writing and drawing comprising:
   substrates;
   electrically conductive layers disposed on said substrates, wherein there is a gap d between said electrically conductive layers;
   a liquid crystal layer including a polymer dispersed, cholesteric liquid crystal material disposed in said gap d,
   wherein said enhanced brightness, cholesteric liquid crystal device follows the relationship $Rd1<Rd2$ and $d1>d2$, where $Rd2$ is a reflectivity of said cholesteric liquid crystal device having a gap $d2$ and $Rd1$ is a reflectivity of another cholesteric liquid crystal device having a gap $d1$, wherein said reflectivities $Rd1$ and $Rd2$ occur as a response of said polymer dispersed, cholesteric liquid crystal material to pressure applied to one of said substrates, considered at a time when said pressure has been removed.

2. An enhanced brightness, cholesteric liquid crystal device of claim 1 wherein said reflectivities, $Rd1$, $Rd2$, are at least 12% and wherein $0.5\ \mu m \le d1 \le 5\ \mu m$ and $0.5\ \mu m \le d2 \le 5\ \mu m$.

3. An enhanced brightness, cholesteric liquid crystal device of claim 1 wherein said reflectivities $Rd1$, $Rd2$ are greater than or equal to 12% and wherein $1\ \mu m < d1 \le 3\ \mu m$ and $1\ \mu m \le d2 \le 3\ \mu m$.

4. An enhanced brightness, cholesteric liquid crystal device of claim 1 comprising an erasing device that applies voltage pulses to the electrically conductive layers.

5. An enhanced brightness, cholesteric liquid crystal device of claim 1 wherein a first of said substrates is formed of a clear flexible polymer material and a writing surface is formed by said first substrate or by an outer clear flexible, polymer layer adjacent to said first substrate, the pressure is applied to said writing surface.

6. An enhanced brightness, cholesteric liquid crystal device of claim 5 wherein said electrically conductive layers include a continuous, unpatterned portion.

7. An enhanced brightness, cholesteric liquid crystal device of claim 6 wherein said continuous, unpatterned portion of said electrically conductive layers extends for at least a majority of a surface area of said writing surface.

8. An enhanced brightness, cholesteric liquid crystal device of claim 1.

9. An enhanced brightness, cholesteric liquid crystal device of claim 8 wherein $d2 \ge 0.5\ \mu m$.

10. An enhanced brightness, cholesteric liquid crystal device of claim 8 wherein $d2 \le 2.5\ \mu m$.

11. An enhanced brightness, cholesteric liquid crystal device of claim 8 having enhanced brightness, wherein $Rd2 \ge 15\%$.

12. An enhanced brightness, cholesteric liquid crystal device of claim 8 comprising bistable said cholesteric liquid crystal material.

13. An enhanced brightness, cholesteric liquid crystal device of claim 8
   wherein said substrates are flexible and comprised of polymer.

14. An enhanced brightness, cholesteric liquid crystal device of claim 1 wherein said electrically conductive layers include a continuous, unpatterned portion.

15. An enhanced brightness, cholesteric liquid crystal device of claim 14 wherein said continuous, unpatterned portion of said electrically conductive layers extends for at least a majority of a surface area of said writing surface.

16. An enhanced brightness, cholesteric liquid crystal device of claim 1 where $Rd2 \ge 15\%$, in an absence of pressure applied to said polymer substrates.

17. An enhanced brightness, cholesteric liquid crystal device for writing and drawing comprising:
   a first substrate and a second substrate, said first substrate comprising a flexible, clear material;
   a first clear, electrically conductive layer disposed on said first substrate and a second electrically conductive layer disposed on said second substrate, wherein there is a gap d between said first electrically conductive layer and said second electrically conductive layer;
   a liquid crystal layer including a polymer dispersed, bistable cholesteric liquid crystal material disposed in said gap d;
   wherein said enhanced brightness, cholesteric liquid crystal device exhibits a reflectivity R at said gap d, which occurs as a response of said polymer dispersed, cholesteric liquid crystal material to pressure applied to said first substrate, considered at a time when said pressure has been removed;
   wherein $R \ge 15\%$ and thickness of the gap d is $0.5\ \mu m \le d \le 4\ \mu m$.

18. An enhanced brightness, cholesteric liquid crystal device of claim 17 wherein the thickness of the gap d is $<3\ \mu m$.

19. An enhanced brightness, cholesteric liquid crystal device of claim 17 wherein the thickness of the gap $d \le 2.5\ \mu m$.

20. A series of enhanced brightness cholesteric liquid crystal eWriter devices for writing and drawing satisfying a regime that follows a negative slope of a plot of reflectivity as a function of cell gap, said eWriter devices including polymer dispersed, cholesteric liquid crystal material disposed in said cell gap, wherein said reflectivity occurs as a response of said polymer dispersed, cholesteric liquid crystal material to applied pressure, considered at a time when said pressure has been removed.

21. A method of constructing an enhanced brightness cholesteric liquid crystal eWriter device for writing and drawing, comprising:
   evaluating polymer dispersed, cholesteric liquid crystal material to identify a regime where there is a negative slope of a plot of reflectivity as a function of cell gap, wherein said reflectivity occurs as a response of said polymer dispersed, cholesteric liquid crystal material to applied pressure, considered at a time when said pressure has been removed;
   selecting a cell gap that satisfies said regime; and
   designing said enhanced brightness cholesteric liquid crystal eWriter device to include said polymer dispersed cholesteric liquid crystal material and said cell gap that satisfies said regime.

* * * * *

UNITED STATES PATENT AND TRADEMARK OFFICE
CERTIFICATE OF CORRECTION

PATENT NO. : 10,287,503 B2
APPLICATION NO. : 15/160767
DATED : May 14, 2019
INVENTOR(S) : Montbach et al.

Page 1 of 1

It is certified that error appears in the above-identified patent and that said Letters Patent is hereby corrected as shown below:

In the Claims

Column 12, Lines 10 and 11 -- Claim 8 should read as follows:
An enhanced brightness, cholesteric liquid crystal device of claim 1 wherein $d2 < 3\mu m$.

And also Column 12, Lines 33-35 -- Claim 16 should read as follows:
An enhanced brightness, cholesteric liquid crystal device of claim 1 where $Rd2 \geq 15\%$.

Signed and Sealed this
Thirtieth Day of July, 2019

Andrei Iancu
*Director of the United States Patent and Trademark Office*